United States Patent
Takahashi (10) Patent No.: US 9,866,934 B2
(45) Date of Patent: Jan. 9, 2018

(54) ELECTRONIC DEVICE (71) Applicant: KYOCERA Corporation, Kyoto-shi, Kyoto (JP)

(72) Inventor: Daisuke Takahashi, Neyagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/194,241

(22) Filed: Jun. 27, 2016

(65) Prior Publication Data

US 2017/0155990 A1    Jun. 1, 2017

(30) Foreign Application Priority Data

Nov. 26, 2015    (JP) .................................. 2015-230834

(51) Int. Cl.
*H04R 1/02* (2006.01)
*H04R 1/08* (2006.01)
*H04M 1/03* (2006.01)

(52) U.S. Cl.
CPC .............. *H04R 1/021* (2013.01); *H04M 1/03* (2013.01); *H04R 1/08* (2013.01); *H04R 1/086* (2013.01); *H04R 1/025* (2013.01); *H04R 1/026* (2013.01); *H04R 2201/029* (2013.01); *H04R 2499/11* (2013.01)

(58) Field of Classification Search
CPC .......... H04R 1/02; H04R 1/023; H04R 1/025; H04R 1/026; H04R 1/04; H04R 1/08; H04R 1/086; H04R 1/34; H04R 1/44; H04R 2499/11; H04R 2499/15; H04R 1/021; H04M 1/03; H04M 1/035
See application file for complete search history.

(56) References Cited

U.S. PATENT DOCUMENTS

| | | | |
|---|---|---|---|
| 2004/0082211 A1* | 4/2004 | Hsieh | H01R 13/03 439/329 |
| 2005/0009580 A1* | 1/2005 | Konno | H04R 1/2892 455/575.1 |
| 2006/0293091 A1 | 12/2006 | Hawker et al. | |
| 2012/0046780 A1* | 2/2012 | Rothkopf | H04R 31/00 700/117 |
| 2016/0014488 A1* | 1/2016 | Iwaya | H04R 3/005 381/91 |

FOREIGN PATENT DOCUMENTS

| | | |
|---|---|---|
| JP | S55-100389 U | 7/1980 |
| JP | S59-193088 U | 12/1984 |
| JP | 2014-192689 A | 10/2014 |
| JP | 2015-061190 A | 3/2015 |

OTHER PUBLICATIONS

Office Action dated Feb. 14, 2017 issued in counterpart Japanese Application No. 2015-230834.

* cited by examiner

*Primary Examiner* — Joshua Kaufman
(74) *Attorney, Agent, or Firm* — Procopio Cory Hargreaves and Savitch LLP (57) ABSTRACT An electronic device includes an elastic member which includes a through hole and a peripheral region surrounding the through hole, a microphone as an acoustic component which covers the through hole and is pressed against the elastic member while the microphone is in contact with the peripheral region, a support member which supports the microphone on a side of the microphone opposite to the elastic member, and a first member which presses the microphone against the elastic member with the support member being interposed.

7 Claims, 6 Drawing Sheets

ELECTRONIC DEVICE

CROSS-REFERENCE TO RELATED APPLICATION

The present application claims priority under 35 U.S.C. §119 to Japanese Patent Application No. 2015-230834 filed on Nov. 26, 2015, entitled "Electronic Device." The content of which is incorporated by reference herein in its entirety.

FIELD

The present disclosure relates to an electronic device.

BACKGROUND

A portable terminal represents one type of electronic devices. A portable terminal of which housing is provided with a through hole through which voice and sound directed to a microphone passes has been known.

SUMMARY

An electronic device based on the present disclosure includes an elastic member, an acoustic component, a support member, and a first member. The elastic member includes a through hole and a peripheral region surrounding the through hole. The acoustic component covers the through hole and is pressed against the elastic member while the acoustic component is in contact with the peripheral region. The support member supports the acoustic component on a side of the acoustic component opposite to the elastic member. The first member presses the acoustic component against the elastic member with the support member being interposed.

The foregoing and other objects, features, aspects and advantages of the present disclosure will become apparent from the following detailed description of the present disclosure when taken in conjunction with the accompanying drawings.

DETAILED DESCRIPTION

A dimensional ratio shown in the drawings does not necessarily faithfully represent an actual dimensional ratio and a dimensional ratio may be exaggerated for the sake of convenience of description. A concept up or upper and down or lower mentioned in the description below does not mean absolute up or upper or down or lower but may mean relative up or upper or down or lower in terms of a shown position.

First Embodiment

Figure 1:
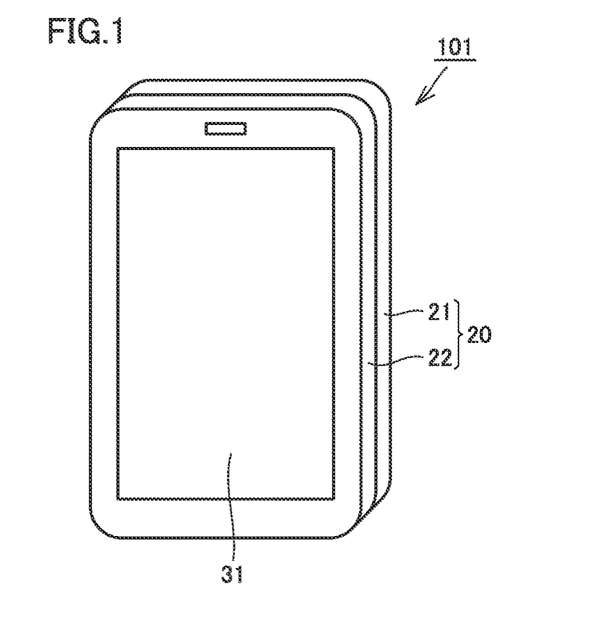
FIG. 1 is a perspective view of an electronic device in a first embodiment based on the present disclosure.

An electronic device in a first embodiment based on the present disclosure will be described with reference to FIGS. 1 to 10. FIG. 1 shows appearance of an electronic device 101 in the first embodiment. Though electronic device 101 is described here as a portable telephone, it is merely by way of example and electronic device 101 is not limited to a portable telephone. Various types of devices can be assumed as electronic device 101.

As shown in FIG. 1, electronic device 101 includes a display area 31 on a front side. Electronic device 101 includes a housing 20. Housing 20 includes a housing component 21 on a rear side and a housing component 22 on a front side. Housing component 21 may be formed by combining a plurality of parts. This is also applicable to housing component 22. Housing component 21 may be formed of a resin and may be formed by combining a resin and a material other than the resin. This is also applicable to housing component 22.

Electronic device 101 includes an acoustic component. The acoustic component herein may include various components such as a microphone and a speaker. By way of example, a case that the acoustic component includes a microphone will be described here.

Figure 2:
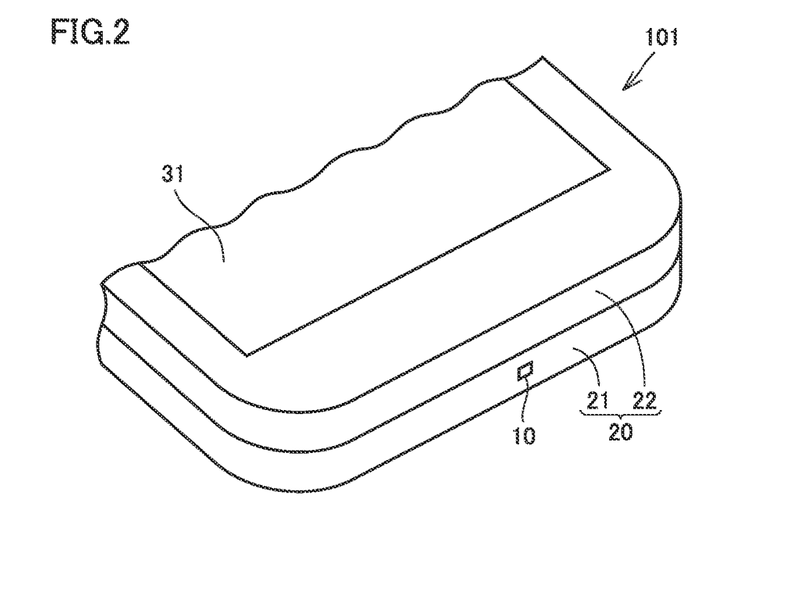
FIG. 2 is a partial perspective view of the electronic device in the first embodiment based on the present disclosure.

FIG. 2 shows a partial perspective view of electronic device 101 positioned to show an end surface thereof. FIG. 2 shows a view of a lower end portion in FIG. 1. Electronic device 101 includes a microphone hole 10 in the end surface. Microphone hole 10 is provided for passage of voice and sound such that a microphone can pick up voice and sound. Though microphone hole 10 is located in housing component 21, microphone hole 10 may be located in housing component 22 instead of housing component 21. The number of microphone holes 10, a shape of microphone hole 10, and a position where microphone hole 10 is to be located are not limited as shown in FIG. 2.

Figure 3:
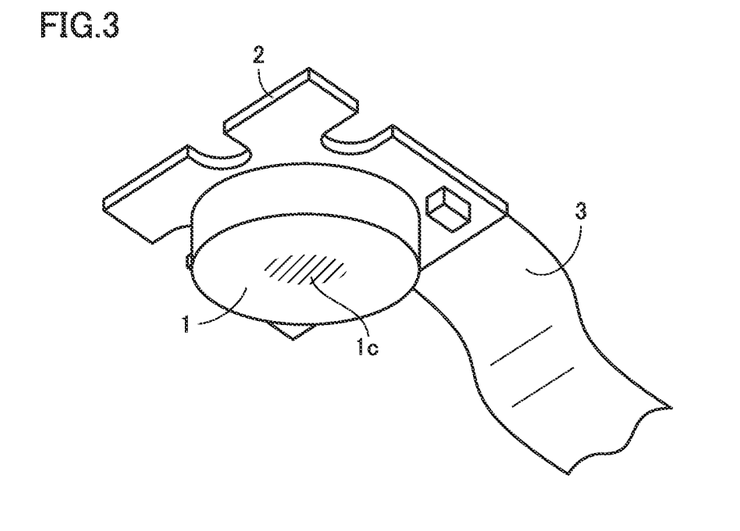
FIG. 3 is a perspective view of an assembly including a microphone and some components around the same.

The microphone and components in the vicinity thereof will be described. FIG. 3 shows only main components around a microphone 1 as being extracted. As shown in FIG. 3, microphone 1 representing the acoustic component is mounted on a support member 2. Support member 2 is connected to a flexible wiring board 3. Support member 2 may be a substrate. Support member 2 may include a multi-layered structure. Though microphone 1 is in a substantially columnar shape in the example shown in FIG. 3, the shape of microphone 1 is not limited as such and may be in another shape. Microphone 1 is shown to include a circular lower surface in FIG. 3, and a sound reception portion 1c is located in a central portion of this surface. FIG. 3 shows a region of sound reception portion 1c with hatching. Microphone 1 can pick up voice and sound at sound reception portion 1c.

Figure 4:
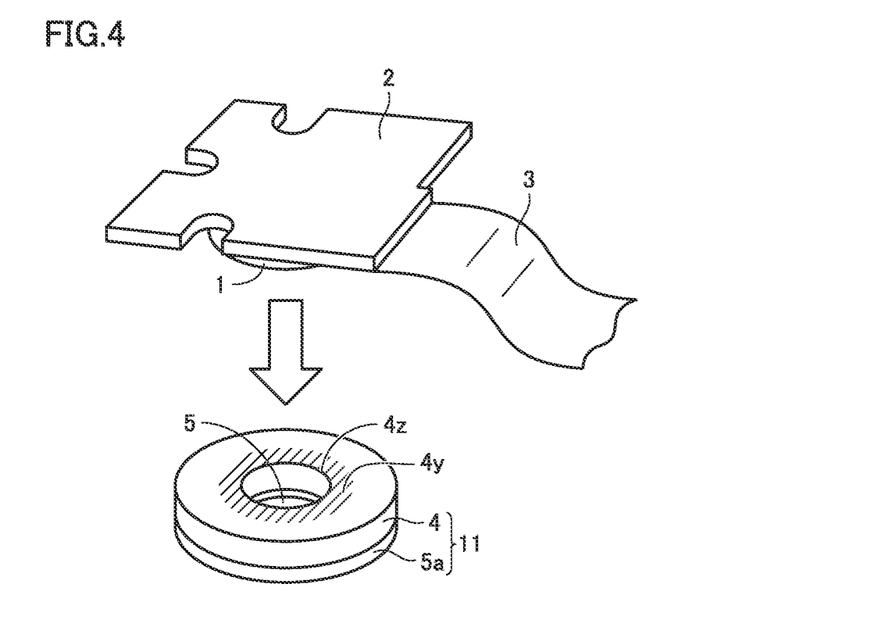
FIG. 4 is a diagram illustrating a microphone mounted on a support member being pressed against an elastic member.

As shown in FIG. 4, microphone 1 mounted on support member 2 is pressed against an elastic member 4. Since microphone 1 is circular in this example, a circular elastic member 4 is prepared. Elastic member 4 has a circular outer shape and includes a circular through hole $4z$ in the center. An upper surface of elastic member 4 includes a peripheral region $4y$. FIG. 4 shows peripheral region $4y$ with hatching. The entire upper surface of elastic member 4 is not necessarily defined as peripheral region $4y$. Peripheral region $4y$ is at a position where it surrounds sound reception portion $1c$ of microphone 1 when microphone 1 is pressed against elastic member 4. In this example, an annular region in the vicinity of through hole $4z$ in the upper surface of elastic member 4 is defined as peripheral region $4y$. Peripheral region $4y$ is an annular region surrounding through hole $4z$. Though the outer shape of elastic member 4 is circular and peripheral region $4y$ is a circular region by way of example here, peripheral region $4y$ is not necessarily circular and it may be in another shape such as a polygon. The outer shape of elastic member 4 is not limited to a circular shape either, and it may be in another shape. Peripheral region $4y$ may be in any shape and it should only be in a shape going around through hole $4z$ once. Microphone 1 is in contact with peripheral region $4y$ over the entire circumference.

When elastic member 4 is pressed against microphone 1, peripheral region $4y$ abuts to microphone 1, elastic member 4 surrounds sound reception portion $1c$ of microphone 1, and sound reception portion $1c$ faces an internal space in through hole $4z$. A waterproof film 5 held by a waterproof film holding portion $5a$ is located under elastic member 4. The sound reception portion faces waterproof film 5 through through hole $4z$. Waterproof film holding portion $5a$ is an annular member surrounding waterproof film 5. Waterproof film 5 is located to block the through hole in the center of waterproof film holding portion $5a$. Waterproof film holding portion $5a$ may be formed from a double-faced tape. In FIG. 4, waterproof film 5 is seen through through hole $4z$ in elastic member 4. Waterproof film 5 is a film which allows passage of air and also vibration of air but does not allow passage of water. Waterproof film 5 can be obtained with a known technique. Elastic member 4 and waterproof film holding portion $5a$ form a stack 11 by being stacked. In the example shown here, an outer diameter of elastic member 4 is substantially equal to an outer diameter of waterproof film holding portion $5a$. An inner diameter of elastic member 4 is substantially equal to an inner diameter of waterproof film holding portion $5a$. An internal space in through hole $4z$ in elastic member 4 is in contact with sound reception portion $1c$ of microphone 1. As this space is surrounded by elastic member 4 and waterproof film holding portion $5a$, it is separated from other spaces in housing 20. Therefore, voice and sound emitted from another component in housing 20 and transmitted through housing 20 can be prevented from reaching sound reception portion $1c$ of microphone 1.

In electronic device 101 in the first embodiment, microphone 1 is installed in housing component 21 in two steps of "provisional installation" and "proper installation."

Figure 5:
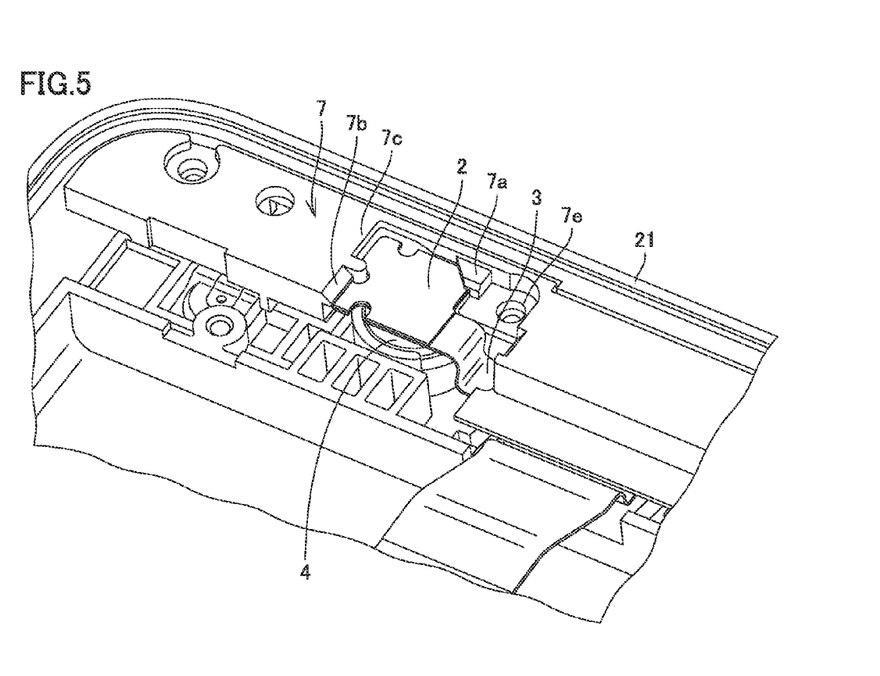
FIG. 5 is a partial perspective view of the microphone provisionally installed in a housing component.
Figure 6:
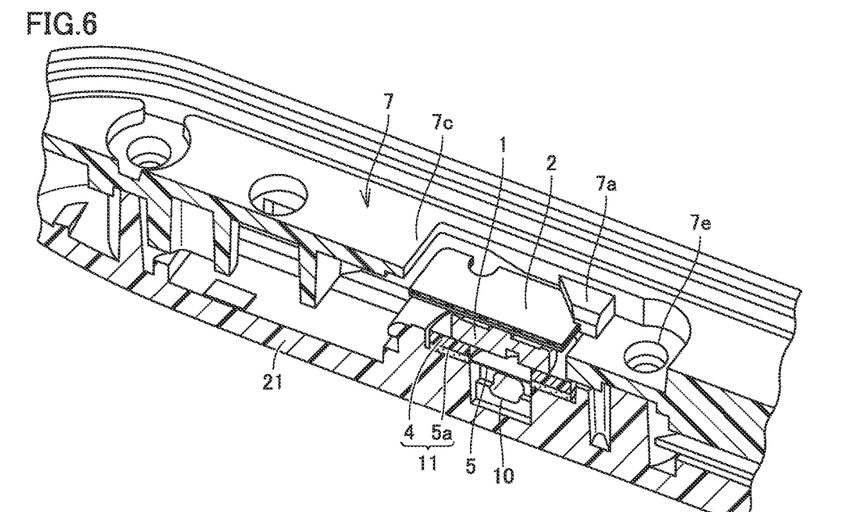
FIG. 6 is a perspective view showing a partial cross-section of the structure shown in FIG. 5.
Figure 7:
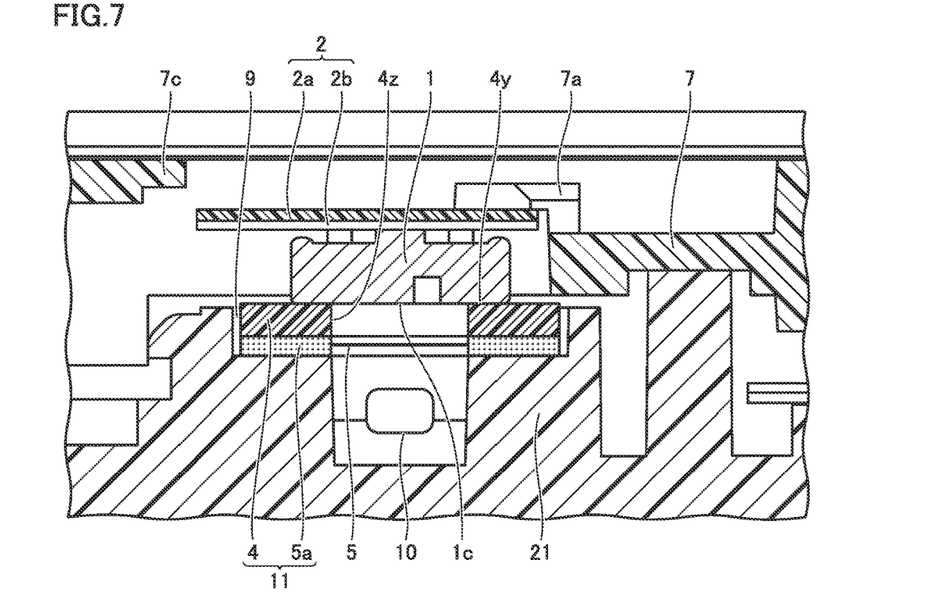
FIG. 7 is a cross-sectional view of a portion in the vicinity of the microphone while the microphone is provisionally installed in the housing component.

FIG. 5 shows microphone 1 provisionally installed in housing component 21. Microphone 1 is handled integrally with support member 2 which holds microphone 1, and is provisionally installed. An end of flexible wiring board 3 extending from support member 2 opposite to support member 2 may be fixed to another component. FIG. 6 shows a perspective view of a cross-section of the portion shown in FIG. 5. FIG. 7 shows a cross-sectional view of a portion in the vicinity of microphone 1. Microphone 1 is installed in the vicinity of one end of housing component 21. Stack 11 of elastic member 4 and waterproof film holding portion $5a$ is installed in housing component 21 and microphone 1 is located thereon. Microphone 1 is located under support member 2 and microphone 1 is hidden under support member 2 in FIG. 5. As shown in FIG. 7, support member 2 includes both of an upper layer $2a$ which is hatched and a lower layer $2b$ which is not hatched. Layer $2a$ and layer $2b$ may be made of the same material or of different materials.

A peripheral member 7 is located to occupy some of a space around microphone 1. Peripheral member 7 may be formed of a resin. As shown in FIG. 5, peripheral member 7 includes protrusions $7a$ and $7b$. Peripheral member 7 includes a portion $7c$ under which a cavity is located. As shown in FIG. 7, housing 21 is provided with a recess portion 9 and stack 11 is located as being inserted in recess portion 9. Stack 11 includes elastic member 4. Peripheral member 7 may be a component separate from housing component 21. As shown in FIG. 7, peripheral region $4y$ at the upper surface of elastic member 4 faces a lower surface of microphone 1.

As shown in FIG. 5, a part of support member 2 is located under protrusions $7a$ and $7b$. As protrusions $7a$ and $7b$ thus catch support member 2, detachment upward of support member 2 is tentatively prevented. Support member 2 may still include play under protrusions $7a$ and $7b$. In this state, microphone 1 does not have to strongly be pressed against elastic member 4. Microphone 1 should only be carried lightly on elastic member 4. At this time point, elastic member 4 does not have to be deformed by compression. Alternatively, elastic member 4 may slightly be deformed by compression. A vertical distance from the upper surface of elastic member 4 to the lower surface of protrusions $7a$ and $7b$ may be greater than a total thickness of microphone 1 and support member 2.

Figure 8:
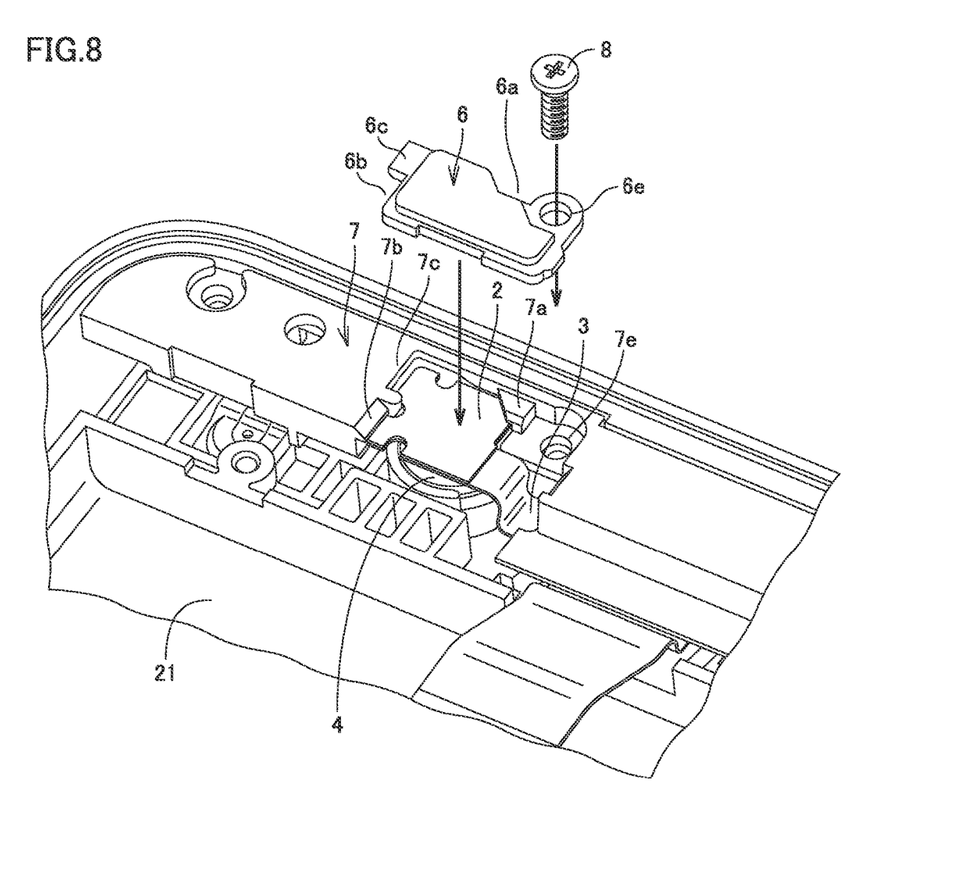
FIG. 8 is a diagram illustrating an operation for properly installing the microphone in the housing component.

FIG. 8 shows operations for proper installation of microphone 1.

Figure 9:
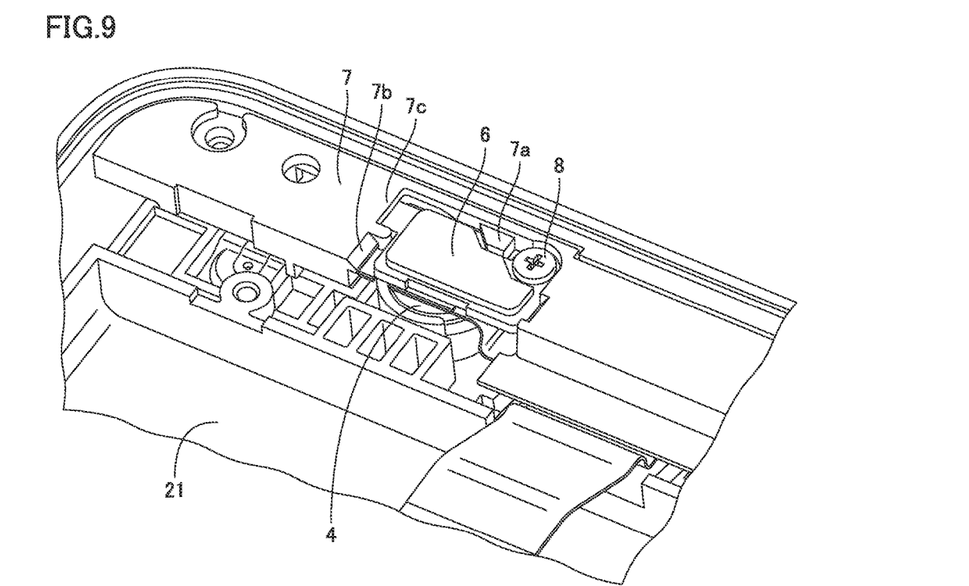
FIG. 9 is a perspective view of the microphone properly installed in the housing component.
Figure 10:
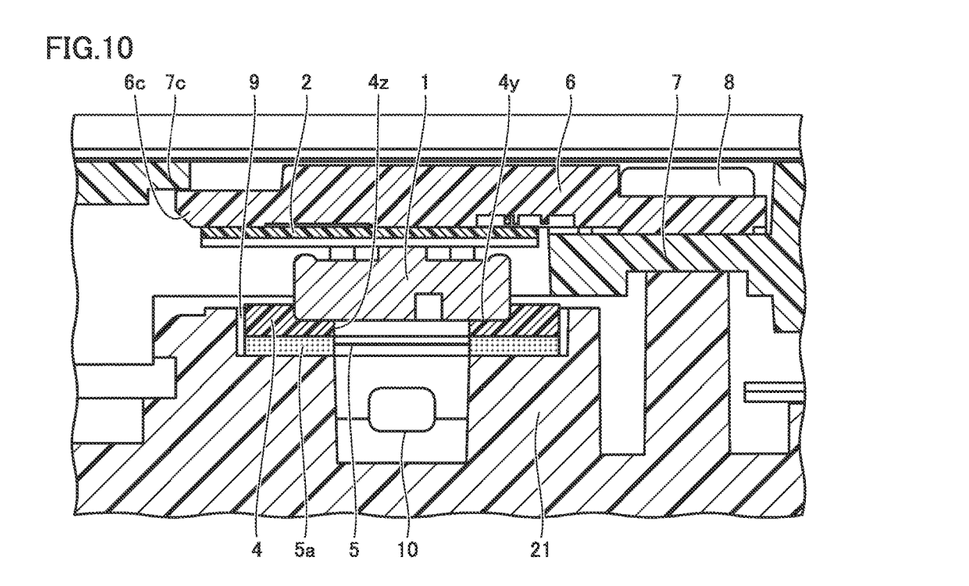
FIG. 10 is a cross-sectional view of the portion in the vicinity of the microphone while the microphone is properly installed in the housing component in the electronic device in the first embodiment based on the present disclosure.

A first member 6 is fixed as abutting from above. Though first member 6 is fixed by a screw 8 in the example shown in FIG. 8, it may be fixed with means other than a screw. Though first member 6 is a component in a form of a plate, it may be in a shape other than a plate. First member 6 may be formed of a resin. First member 6 includes a through hole $6e$ at one end portion for passage of screw 8. First member 6 includes a notch $6a$ for avoiding interference with protrusion $7a$. First member 6 includes a notch $6b$ for avoiding interference with protrusion $7b$. First member 6 includes a projecting portion $6c$ for insertion under portion $7c$ of peripheral member 7. Screw 8 is screwed into a screw hole $7e$ in peripheral member 7 through through hole $6e$ in first member 6. FIG. 9 shows that fixing of first member 6 with screw 8 has been completed. FIG. 10 shows a cross-sectional view in this state. In this state, first member 6 presses support member 2 and microphone 1 against elastic member 4 located below. In FIG. 10, peripheral region $4y$ of elastic member 4 abuts to microphone 1. Microphone 1 pushes peripheral region $4y$ so that elastic member 4 is deformed by compression. This deformation is within a range of elastic deformation of elastic member 4. As a result of compression deformation of elastic member 4, it is in a shape in conformity with the outer shape of microphone 1. The lower surface of first member 6 abuts to the upper surface of support member 2. In this state, microphone 1 is fixed while it deforms elastic member 4 by compression, and there is no play around microphone 1. As shown in FIG. 10, projecting portion $6c$ of first member 6 is located under portion $7c$. An upper surface of projecting portion $6c$ is pressed by a lower surface of portion $7c$. This state is the state that proper installation of microphone 1 is completed. An upper surface of first member 6 is substantially flush with an upper surface of peripheral member 7.

In FIG. 10, microphone hole 10 located in housing component 21 is seen. Microphone hole 10 is located in a direction turned at a right angle, rather than in a direction in which it directly faces the sound reception portion of microphone 1. Microphone hole 10 passes through in a direction forward from the rear of the sheet surface in FIG. 10. A space outside housing 20 extends to the rear of microphone hole 10 in FIG. 10 with respect to the sheet surface. Sound which enters housing 20 through microphone hole 10 from the outside of housing 20 can reach microphone 1 through waterproof film 5.

Features of the electronic device in the first embodiment are summarized as below.

Electronic device 101 includes elastic member 4 which includes through hole 4z and peripheral region 4y surrounding through hole 4z, microphone 1 which covers through hole 4z and is pressed against elastic member 4 while it is in contact with peripheral region 4y, support member 2 which supports microphone 1 on a side of microphone 1 opposite to elastic member 4, and first member 6 which presses microphone 1 against elastic member 4 with support member 2 being interposed.

First member 6 presses microphone 1 against elastic member 4 while support member 2 is located between first member 6 and microphone 1. Force with which first member 6 presses microphone 1 against elastic member 4 is transmitted to microphone 1 from first member 6 via support member 2.

In the first embodiment, since a structure is such that proper installation is achieved by pressing microphone 1 against elastic member 4 by using first member 6 with support member 2 being interposed after provisional installation for locating microphone 1 with elastic member 4 being not substantially compressed or being not compressed at all, pressing by microphone 1 against elastic member 4 can be uniform. Occurrence of howling due to incomplete separation of the sound reception portion of the microphone can thus be avoided as much as possible.

As shown in the first embodiment, electronic device 101 may include peripheral member 7 as a second member surrounding support member 2 and the second member may include projecting portions 7a and 7b which overlap with support member 2 on a side of support member 2 opposite to elastic member 4 (see FIGS. 5, 8, and 9). With the second member having such projecting portions 7a and 7b, in the state of provisional installation of support member 2, support member 2 can be stabilized as being caught by projecting portions 7a and 7b. In other words, detachment of support member 2 upward can be prevented. An operation for assembly can thus be facilitated. The number, a shape, a size, and positional relation of projecting portions 7a and 7b shown in the first embodiment are merely by way of example and not limited as illustrated.

As shown in the first embodiment, first member 6 may be screwed as abutting to peripheral member 7 serving as the second member (see FIGS. 9 and 10). By adopting this construction, first member 6 can securely be fixed. As first member 6 abuts to the second member, a position of first member 6 can reliably be set to a desired position.

As shown in the first embodiment, peripheral member 7 serving as the second member may include portion 7c as a first member pressing portion which overlaps with first member 6 on a side of first member 6 opposite to elastic member 4. By adopting this construction, positioning of first member 6 is facilitated. Since at least one end of first member 6 can be fixed as portion 7c lies over a part of first member 6, attachment of first member 6 is facilitated. Complete attachment of first member 6 can be achieved also by fixing a remaining portion of first member 6, for example, with a single screw alone.

As shown in the first embodiment, electronic device 101 may comprise waterproof film 5 which is located to close through hole 4z on a side of elastic member 4 opposite to microphone 1. By adopting this construction, an electronic device can be waterproof.

As shown in the first embodiment, first member 6 may be in a form of a plate. By adopting this construction, a structure achieving uniform pressing by microphone 1 against elastic member 4 can be achieved in a space of a small thickness. The shape of first member 6 shown in the first embodiment is merely by way of example and not limited to the shape illustrated. Various shapes other than this are applicable as the shape of first member 6.

Though description has been given so far assuming that an acoustic component is a microphone, the acoustic component may be a component other than the microphone. The acoustic component may be, for example, a speaker or a receiver. As shown in the first embodiment, the acoustic component may include a microphone. In a construction in which the acoustic component includes a microphone, howling undesirably caused by pick-up of sound from another component by a microphone may give rise to a problem. By adopting the construction described here, however, a benefit can noticeably be enjoyed.

Some features in an embodiment above may be adopted as being combined as appropriate.

Though description has been given so far by using the term "electronic device," the electronic device is a broad concept covering, for example, a portable telephone, a portable information terminal, a tablet terminal, a personal computer, a game console, a television receiver, a portable music player, a CD player, a DVD player, an electronic calculator, an electronic organizer, an electronic dictionary, an electronic book reader, a digital camera, a video camera, a radio receiver, a navigation system, and a measurement instrument. The concept of the portable telephone or the portable information terminal includes a smartphone.

Though an embodiment of the present disclosure has been described, it should be understood that an embodiment disclosed herein is illustrative and non-restrictive in every respect. The scope of the present disclosure is defined by the terms of the claims and is intended to include any modifications within the scope and meaning equivalent to the terms of the claims.

The invention claimed is:

1. An electronic device comprising:
    an elastic member which includes a through hole and a peripheral region surrounding the through hole;
    an acoustic component which covers the through hole and is pressed against the elastic member while the acoustic component is in contact with the peripheral region;
    a support member which supports the acoustic component on a side of the acoustic component opposite to the elastic member; and
    a first member which presses the acoustic component against the elastic member with the support member being interposed, the first member including an upper surface and a projecting portion;
    a second member which surrounds the support member and includes an upper surface, the second member including a portion which the projecting portion of the first member is inserted under on a side of the support member opposite to the elastic member, the upper surface of the second member being substantially flush with the upper surface of the first member.

2. The electronic device according to claim 1, wherein the first member is screwed as abutting to the second member.

3. The electronic device according to claim 1, wherein the second member includes a first member pressing portion which overlaps with a part of the first member on a side of the first member opposite to the elastic member.

4. The electronic device according to claim 1, the electronic device comprising
   a waterproof film located to close the through hole, on a side of the elastic member opposite to the acoustic component.

5. The electronic device according to claim 1, wherein the first member is in a form of a plate.

6. The electronic device according to claim 1, wherein the acoustic component comprises a microphone.

7. The electronic device according to claim 1, wherein the second member includes more than one protrusion and the first member has more than one notch that avoids interference with the more than one protrusion of the second member.

* * * * *